United States Patent Office 2,734,905
Patented Feb. 14, 1956

2,734,905

DERIVATIVES OF PYRIDINE-4-CARBOXYLIC ACID HYDRAZIDE AND METHODS OF MANUFACTURING THE SAME

Otto Zima, Darmstadt-Eberstadt, and Fritz von Werder, Darmstadt, Germany, assignors to E. Merck Aktiengesellschaft, Darmstadt, West Germany, a corporation of Germany No Drawing. Application July 26, 1954,
Serial No. 445,943

7 Claims. (Cl. 260—295)

This invention relates to new tuberculostatic compounds and methods for their manufacture. More particularly this invention relates to derivatives of isonicotinic acid hydrazide which are characterized by their low toxicity and high activity against tubercular bacillus. The compounds of this invention may be represented by the following general formula:

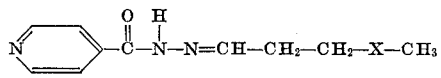

wherein X is a member of the group consisting of —S— and —SO—.

It is well known in the art that isonicotinic acid hydrazide (Isoniazid) has marked therapeutic properties and has been widely used to combat tuberculosis. We have found that the new compounds of our invention have distinct advantages over the known isonicotinic acid hydrazide, specifically they are better tolerated with a minimum or markedly reduced side effects.

The compounds of our invention may be prepared in accordance with customary procedures for synthesis of carboxylic acid hydrazides. We prefer to utilize isonicotinic acid hydrazide as the starting material and react it with a beta-substituted propionaldehyde. The reaction is depicted in the following equations giving rise to the compounds of our invention wherein X is as above defined.

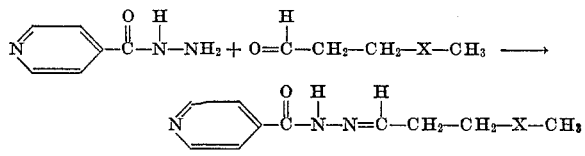

Alternatively, oxidation of the beta-methylthiopropylidine hydrazide, with hydrogen peroxide for example, according to the following equation, yields the new compound of our invention wherein X is >SO:

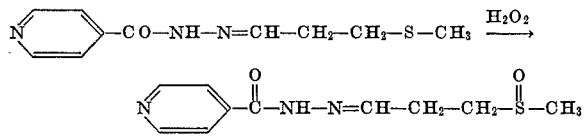

The following examples are illustrative of methods of manufacture of the compounds of our invention, but in no way are to be construed as limiting the scope of this invention except as defined in the dependent claims.

EXAMPLE I

*Pyridine-4-carboxylic acid-beta-methylthiopropylidine hydrazide*

A mixture of 13.7 g. of isonicotinic acid hydrazide and 75 g. of water is stirred and heated at 40° until solution is effected. To the stirred solution is added 10.5 g. of beta-methylthiopropionaldehyde. The temporarily clear solution suddenly becomes turbid and the desired compound separates as an oil. The reaction vessel is cooled in an ice bath and stirring is continued until the oily product crystallizes. The solid is removed by filtration, dried and recrystallized from ethyl acetate yielding 20–22 g. of the compound of this example as colorless crystals, M. P. 95–96°.

EXAMPLE II

*Pyridine-4-carboxylic acid-beta-methylsulfoxypropylidine hydrazide*

To a stirred and cooled suspension of 18 g. of the beta-methylthiopropylidine hydrazide obtained in Example I and 90 g. of water is dropwise added 10 g. of 30% hydrogen peroxide keeping the temperature below 50°. The resultant clear solution is evaporated in vacuo and the residue is recrystallized from absolute ethanol yielding the beta-methylsulfoxypropylidine hydrazide of this example, M. P. 127°.

Alternatively, the compound of this example may be prepared from the reaction of 13.7 g. of isonicotinic acid hydrazide and 12 g. of beta-methylsulfoxypropionaldehyde according to the procedure of Example I. The clear reactant solution is evaporated in vacuo and the residue recrystallized from ethanol as above described.

We claim:

1. Compounds of the following formula:

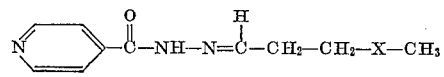

wherein X is a member of the group consisting of >S and >SO.

2. Pyridine - 4 - carboxylic acid-beta-methylthiopropylidine hydrazide having the formula:

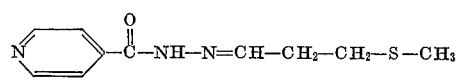

3. Pyridine-4-carboxylic acid methylsulfoxypropylidine hydrazide having the formula:

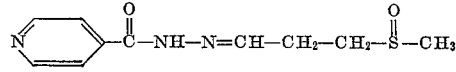

4. The process for the manufacture of derivatives of isonicotinic acid hydrazide which comprises reacting isonicotinic acid hydrazide with a propionaldehyde having the following formula:

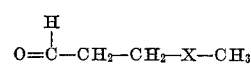

wherein X is a member of the group consisting of >S and >SO and isolating the product thereby formed.

5. The process for the manufacture of the compounds having the following formula:

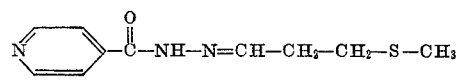

which comprises reacting isonicotinic acid hydrazide with beta-methylthiopropionaldehyde and isolating the product thereby formed.

6. The process for the manufacture of the compounds having the following formula:

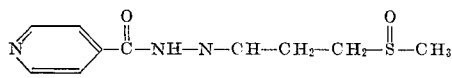

which comprises reacting isonicotinic acid hydrazide with beta-methylsulfoxypropionaldehyde and isolating the product thereby formed.

7. The process for the manufacture of the compounds having the following formula:

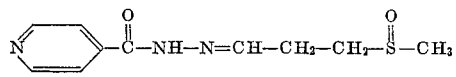

which comprises treating a solution of pyridine-4-carboxylic acid beta-methylthiopropylidine hydrazide with hydrogen peroxide and isolating the sulfoxide thereby formed.

References Cited in the file of this patent

FOREIGN PATENTS 1,050,783     France _____ Sept. 9, 1953